(12) United States Patent
Furuya (10) Patent No.: US 7,838,113 B2
(45) Date of Patent: Nov. 23, 2010

(54) MULTIFUNCTIONAL MATERIAL HAVING CARBON-DOPED TITANIUM OXIDE LAYER

(75) Inventor: Masahiro Furuya, Komae (JP)

(73) Assignee: Central Research Institute of Electric Power Industry, Tokyo (JP)

( * ) Notice: Subject to any disclaimer, the term of this patent is extended or adjusted under 35 U.S.C. 154(b) by 1173 days.

(21) Appl. No.: 10/574,199

(22) PCT Filed: Dec. 8, 2004

(86) PCT No.: PCT/JP2004/018310

§ 371 (c)(1),
(2), (4) Date: Mar. 31, 2006

(87) PCT Pub. No.: WO2005/056866

PCT Pub. Date: Jun. 23, 2005

(65) Prior Publication Data

US 2007/0040278 A1    Feb. 22, 2007

(30) Foreign Application Priority Data

Dec. 9, 2003  (JP) .............................. 2003-411079
Dec. 9, 2003  (JP) .............................. 2003-411080
Dec. 9, 2003  (JP) .............................. 2003-411081

(51) Int. Cl.
    *B32B 9/00* (2006.01)
(52) U.S. Cl. .................. 428/408; 428/457; 428/697; 428/699; 428/701; 502/350
(58) Field of Classification Search ................ 428/408, 428/457, 697, 698, 699, 701; 502/350
    See application file for complete search history.

(56) References Cited

U.S. PATENT DOCUMENTS 6,194,346 B1 *   2/2001   Tada et al. ................... 502/224

(Continued)

FOREIGN PATENT DOCUMENTS

JP           9-87857 A         3/1997

(Continued)

OTHER PUBLICATIONS

Irie et al "Carbon-doped Anatase Tio2 powders as a visible light sensitive Photocatalyst", Chemistry Letter vol. 32, No. 8. (2003).*

(Continued)

*Primary Examiner*—A. Turner
(74) *Attorney, Agent, or Firm*—Sughrue Mion, PLLC (57) ABSTRACT

A multifunctional material having a carbon-doped titanium oxide layer, which has carbon doped in the state of Ti—C bonds, is excellent in durability (high hardness, scratch resistance, wear resistance, chemical resistance, heat resistance) and functions as a visible light responding photocatalyst, is provided. The multifunctional material of the present invention is obtained, for example, by heat-treating the surface of a substrate, which has at least a surface layer comprising titanium, a titanium alloy, a titanium alloy oxide, or titanium oxide, in a combustion gas atmosphere of a gas consisting essentially of a hydrocarbon such that the surface temperature of the substrate is 900 to 1,500° C.; or by directly striking a combustion flame of a gas consisting essentially of a hydrocarbon, against the surface of the substrate for heat treatment such that the surface temperature of the substrate is 900 to 1,500° C.

16 Claims, 7 Drawing Sheets

U.S. PATENT DOCUMENTS

| | | | | |
|---|---|---|---|---|
| 6,238,738 | B1* | 5/2001 | McCurdy | 65/60.5 |
| 6,306,343 | B1 | 10/2001 | Sugiyama | |
| 6,743,749 | B2* | 6/2004 | Morikawa et al. | 502/350 |
| 6,794,065 | B1 | 9/2004 | Morikawa et al. | |
| 6,863,987 | B2* | 3/2005 | Kaneko et al. | 428/472.1 |
| 7,175,911 | B2* | 2/2007 | Zhou et al. | 428/403 |

FOREIGN PATENT DOCUMENTS

| | | |
|---|---|---|
| JP | 11-43770 A | 2/1999 |
| JP | 2001-49421 A | 2/2001 |
| JP | 2001-205094 A | 7/2001 |
| JP | 2001-205103 A | 7/2001 |
| JP | 2002-12962 A | 1/2002 |
| JP | 2002-028998 | 1/2002 |
| JP | 2002-95976 A | 4/2002 |
| JP | 2002-097914 | 4/2002 |
| JP | 2003-73799 A | 3/2003 |
| JP | 2004-167370 A | 6/2004 |
| JP | 2004-283790 A | 10/2004 |
| JP | 2005-047786 | 2/2005 |
| JP | 2005-47787 A | 2/2005 |
| WO | WO 98/23374 A1 | 6/1998 |
| WO | WO 01/10553 A1 | 2/2001 |

OTHER PUBLICATIONS

Akira Fujishima, et al, "Hydrogen Production Under Sunlight With An Electrochemical Photocell", J. Electrochem. Soc., vol. 122, No. 11, Nov. 1975, pp. 1487-1489.

R. Asahi, et al, "Visible-Light Photocatalysis in Nitrogen-Doped Titanium Oxides", Science, vol. 293, Jul. 13, 2001, pp. 269-271.

Shahed U. M. Khan, et al, "Efficient Photochemical Water Splitting by a Chemically Modified n-$TiO_2$", Science vol. 297, Sep. 27, 2002, pp. 2243-2245.

S. Sakthivel, et al.; "Daylight Photocatalysis by Carbon-Modified Titanium Dioxide"; Angew. Chem. Int. Ed.; Wiley VCH Verlag, Weinheim, DE; vol. 42; No. 40; Oct. 20, 2003; pp. 4908-4911.

* cited by examiner

At time of film formation          After 145 days in smoking room (b) Comp. Ex. 1

At time of film formation          After 145 days in smoking room

MULTIFUNCTIONAL MATERIAL HAVING CARBON-DOPED TITANIUM OXIDE LAYER

TECHNICAL FIELD

This invention relates to a multifunctional material having a carbon-doped titanium oxide layer having carbon doped in the state of Ti—C bonds. More specifically, the invention relates to a multifunctional material having a carbon-doped titanium oxide layer, which has carbon doped in the state of Ti—C bonds, which is excellent in durability (high hardness, scratch resistance, wear resistance, chemical resistance, heat resistance), and which functions as a visible light responding photocatalyst.

BACKGROUND ART

Titanium dioxide TiO2 (simply referred to as titanium oxide herein and in the claims) has hitherto been known as a substance showing a photocatalytic function. As methods for forming a titanium oxide film on a titanium metal, there have been known since the 1970s a method for forming a titanium oxide film on a titanium metal by anodic oxidation, a method for thermally forming a titanium oxide film on a titanium metal plate in an electric furnace supplied with oxygen, and a method for forming a titanium oxide film on a titanium metal by heating a titanium plate in flames of a city gas at 1,100 to 1,400° C. (see non-patent document 1). Numerous studies designed to achieve the practical use of photocatalysts have been conducted in many technical fields.

To manufacture photocatalyst products for obtaining a deodorizing, antimicrobial, anti-fogging, or antifouling effect by such a photocatalytic function, it has been common practice to impart a titanium oxide sol onto a substrate by spray coating, spin coating, or dipping, thereby forming a film. However, the resulting film is apt to peel off or wear, and thus its long-term use has been difficult.

Ultraviolet radiation with a wavelength of 400 nm or less is necessary for titanium oxide to function as aphotocatalyst, but many studies have been performed on titanium oxide photocatalysts which are doped with various elements to function by visible light. For example, there is a report comparing titanium oxides doped with, for example, F, N, C, S, P and Ni, and showing the nitrogen-doped titanium oxide to be excellent as a visible light responding photocatalyst (see non-patent document 2).

As titanium oxide photocatalysts doped with other elements as shown above, proposals were made for a photocatalyst comprising a titanium compound Ti—O—X having the oxygen site of titanium oxide substituted by an atom X such as nitrogen, or an anion X, a photocatalyst comprising a titanium compound Ti—O—X having an atom X such as nitrogen, or an anion X, doped in the spaces of the crystal lattice of titanium oxide, and a photocatalyst comprising a titanium compound Ti—O—X having an atom X such as nitrogen, or an anion X, disposed at the grain boundaries of polycrystalline aggregates of titanium oxide crystals (see patent documents 1 to 4).

A further report says that natural gas combustion flames with the temperature of combustion flames maintained in the vicinity of 850° C., for example, by adjusting the flow rates of a natural gas and/or oxygen were struck against a titanium metal to obtain chemically modified titanium oxide n-$TiO_{2-x}C_x$, which absorbed light at 535 nm or less (see non-patent document 3).

Patent document 1: Japanese Patent Application Laid-Open No. 2001-205103 (claims)

Patent document 2: Japanese Patent Application Laid-Open No. 2001-205094 (claims)

Patent document 3: Japanese Patent Application Laid-Open No. 2002-95976 (claims)

Patent document 4: International Publication 01/10553 brochure (claims)

Non-patent document 1: A. Fujishima et al., J. Electrochem. Soc. Vol. 122, No. 11, p. 1487-1489, November 1975

Non-patent document 2: R. Asahi et al., SCIENCE Vol. 293, Jul. 13, 2001, p. 269-271

Non-patent document 3: Shahed U. M. Khan et al., SCIENCE Vol. 297, Sep. 27, 2002, p. 2243-2245

DISCLOSURE OF THE INVENTION

Problems to be Solved by the Invention

However, conventional titanium oxide-based photocatalysts, whether of the ultraviolet ray responding type or of the visible light responding type, were problematical in durability (high hardness, scratch resistance, wear resistance, chemical resistance, heat resistance), posing a bottleneck in practical use.

It is an object of the present invention to provide a multifunctional material having, as a surface layer, a carbon-doped titanium oxide layer, which is excellent in durability (high hardness, scratch resistance, wear resistance, chemical resistance, heat resistance), and which functions as a visible light responding photocatalyst.

Means for Solving the Problems

The inventor conducted in-depth studies in an attempt to attain the above object, and has found the following facts: The surface of a substrate having a surface layer comprising titanium, a titanium alloy, a titanium alloy oxide, or titanium oxide is heat-treated at a high temperature with the use of a combustion flame of a gas, which consists essentially of a hydrocarbon. By so doing, there is obtained a multifunctional material having, as a surface layer, a carbon-doped titanium oxide layer, which has carbon doped in the state of Ti—C bonds, which is excellent in durability (high hardness, scratch resistance, wear resistance, chemical resistance, heat resistance), and which functions as a visible light responding photocatalyst. Based on this finding, the inventor accomplished the present invention.

That is, the multifunctional material of the present invention is characterized by having at least a surface layer comprising a carbon-doped titanium oxide layer, having the carbon doped in the state of Ti—C bonds, being excellent in durability, and functioning as a visible light responding photocatalyst.

The visible light responding photocatalyst of the present invention is characterized by having at least a surface layer comprising a carbon-doped titanium oxide layer, and having the carbon doped in the state of Ti—C bonds.

Effects of the Invention

The multifunctional material of the present invention is excellent in durability (high hardness, scratch resistance, wear resistance, chemical resistance, heat resistance), and functions as a visible light responding photocatalyst. Thus, the multifunctional material not only can be used as a visible light responding photocatalyst, but also can be meaningfully utilized in various technical fields where hard chromium platings have been utilized so far.

BEST MODE FOR CARRYING OUT THE INVENTION

The multifunctional material of the present invention can be produced by heat-treating the surface of a substrate, which has at least a surface layer comprising titanium, a titanium alloy, a titanium alloy oxide, or titanium oxide, at a high temperature, for example, with the use of a combustion flame of a gas consisting essentially of a hydrocarbon. This substrate having at least a surface layer comprising titanium, a titanium alloy, a titanium alloy oxide, or titanium oxide may be structured such that the whole of the substrate is composed of one of titanium, a titanium alloy, a titanium alloy oxide, and titanium oxide, or that the substrate is composed of a surface portion forming layer and a core material, and the materials for them are different. In regard to the shape of the substrate, the substrate may be in a final product form (a flat plate form or a three-dimensional form) desired to have durability, such as high hardness, scratch resistance, wear resistance, chemical resistance, or heat resistance, or in a final product form desired to have the function of a visible light responding photocatalyst on the surface, or in a powdery form.

If the substrate, which has at least a surface layer comprising titanium, a titanium alloy, a titanium alloy oxide, or titanium oxide, is composed of the surface portion forming layer and the core material, and the materials for them are different, then the thickness of the surface portion forming layer may be the same as the thickness of the resulting carbon-doped titanium oxide layer (namely, the entire surface portion forming layer is the carbon-doped titanium oxide layer), or may be larger than the thickness of the carbon-doped titanium oxide layer (namely, a part in the thickness direction of the surface portion forming layer is the carbon-doped titanium oxide layer, while the other part remains intact). The material for the core material is not limited, unless it burns, melts or deforms during heat treatment in the manufacturing method of the present invention. For example, iron, an iron alloy, a nonferrous alloy, ceramic, or other pottery, or high temperature heat resistant glass can be used as the core material. Examples of such a substrate composed of the thin-film-shaped surface layer and the core material are those having a film comprising titanium, a titanium alloy, a titanium alloy oxide, or titanium oxide, formed on the surface of the core material by a method such as sputtering, vapor deposition, or thermal spraying, or those having a film formed on the surface of the core material by imparting a commercially available titanium oxide sol onto this surface by spray coating, spin coating, or dipping.

If the substrate, which has at least a surface layer comprising titanium, a titanium alloy, a titanium alloy oxide, or titanium oxide, is powdery, all of the particles of the powder can be converted into carbon-doped titanium oxide by heat treatment as mentioned above, in case the particle size of the powder is small. In the present invention, however, it suffices for only the surface layer to become carbon-doped titanium oxide, so that no restriction is imposed on the particle size of the powder. However, it is preferred that the particle size of the powder is 15 nm or more, in consideration of the ease of the heat treatment, and the ease of manufacturing.

Various publicly known titanium alloys can be used as the above titanium alloy, without restriction. For example, it is possible to use Ti-6Al-4V, Ti-6Al-6V-2Sn, Ti-6Al-2Sn-4Zr-6Mo, Ti-10V-2Fe-3Al, Ti-7Al-4Mo, Ti-5Al-2.5Sn, Ti-6Al-5Zr-0.5Mo-0.2Si, Ti-5.5Al-3.5Sn-3Zr-0.3Mo-1Nb-0.3Si, Ti-8Al-1Mo-1V, Ti-6Al-2Sn-4Zr-2Mo, Ti-5Al-2Sn-2Zr-4Mo-4Cr, Ti-11.5Mo-6Zr-4.5Sn, Ti-15V-3Cr-3Al-3Sn, Ti-15Mo-5Zr-3Al, Ti-15Mo-5Zr, and Ti-13V-11Cr-3Al.

In the manufacture of the multifunctional material according to the present invention, a combustion flame of a gas consisting essentially of a hydrocarbon, especially acetylene, can be used, and it is particularly desirable to utilize a reducing flame. If a fuel having a low hydrocarbon content is used, the amount of carbon doped is inadequate or zero, resulting in insufficient hardness and insufficient photocatalytic activity under visible light. In the manufacture of the multifunctional material according to the present invention, the gas consisting essentially of a hydrocarbon refers to a gas containing at least 50% by volume of a hydrocarbon. For example, this gas refers to a gas containing at least 50% by volume of acetylene and, as appropriate, incorporating air, hydrogen or oxygen. In the manufacture of the multifunctional material of the present invention, the gas consisting essentially of a hydrocarbon preferably contains 50% or more by volume of acetylene, and most preferably contains 100% of acetylene as the hydrocarbon. If an unsaturated hydrocarbon, especially acetylene having a triple bond, is used, the unsaturated bond portion decomposes, particularly, in the reducing flame during the course of its combustion to form an intermediate radical substance. This radical substance has strong activity, and thus is considered to easily cause carbon doping.

In the manufacture of the multifunctional material of the present invention, if the surface layer of the substrate to be heat-treated is titanium or a titanium alloy, oxygen for oxidizing the titanium or titanium alloy is needed. Thus, the gas needs to contain a corresponding amount of air or oxygen.

In the manufacture of the multifunctional material of the present invention, the surface of the substrate, which has a surface layer comprising titanium, a titanium alloy, a titanium alloy oxide, or titanium oxide, is heat-treated at a high temperature with the use of a combustion flame of a gas consisting essentially of a hydrocarbon. In this case, a combustion flame of the gas, which consists essentially of a hydrocarbon, may be directly struck against the surface of the substrate; or the surface of the substrate maybe heat-treated at a high temperature in a combustion gas atmosphere of the gas consisting essentially of a hydrocarbon. The heat treatment can be performed, for example, in a furnace. If a combustion flame is directly struck against the surface of the substrate for heat treatment at a high temperature, the aforementioned fuel gas may be burned within a furnace, and its combustion flame may be struck against the surface of the substrate. If heat treatment is performed at a high temperature in a combustion gas atmosphere, the above fuel gas is burned in a furnace, and its high temperature combustion gas atmosphere is utilized. If the substrate, which has at least a surface layer comprising titanium, a titanium alloy, a titanium alloy oxide, or titanium oxide, is powdery, such a powder is introduced into a flame, and is allowed to dwell in the flame for a predetermined time, to carry out heat treatment. Alternatively, such a powder is maintained in a fluidized bed state for a predetermined time in a high temperature combustion gas placed in a fluid state. By so doing, all the particles can be converted into carbon-doped titanium oxide having carbon doped in the state of Ti—C bonds, or the powder can be made into a powder having a carbon-doped titanium oxide layer having carbon doped in the state of Ti—C bonds.

The heat treatment needs to be performed such that the surface temperature of the substrate is 900 to 1,500° C., preferably 1,000 to 1,200° C., and that a carbon-doped titanium oxide layer having carbon doped in the state of Ti—C bonds is formed as the surface layer of the substrate. In the case of heat treatment resulting in the surface temperature of the substrate of lower than 900° C., the durability of the substrate having the resulting carbon-doped titanium oxide layer is insufficient, and its photocatalytic activity under visible light is also insufficient. In the case of heat treatment rendering the surface temperature of the substrate higher than 1,500° C., on the other hand, a super-thin film peels off the substrate surface portion during cooling after heat treatment, and the effect of durability (high hardness, scratch resistance, wear resistance, chemical resistance, heat resistance) aimed at by the present invention is not obtained. Even with heat treatment leading to the surface temperature of the substrate within the range of 900 to 1,500° C., a prolonged heat treatment time causes peeling of a super-thin film from the substrate surface portion during cooling after heat treatment, and the effect of durability (high hardness, scratch resistance, wear resistance, chemical resistance, heat resistance) aimed at by the present invention is not obtained. Thus, the heat treatment time needs to be a time which does not cause peeling to the substrate surface portion during cooling after heat treatment. That is, the heat treatment time needs to be a time which is enough to convert the surface layer into a carbon-doped titanium oxide layer having carbon doped in the state of Ti—C bonds, but which does not cause peeling of the super-thin film from the substrate surface portion during cooling after heating. This heat treatment time is in correlation with the heating temperature, but is preferably about 400 seconds or less.

In the manufacture of the multifunctional material of the present invention, a carbon-doped titanium oxide layer containing 0.3 to 15 at %, preferably 1 to 10 at %, of carbon and having the carbon doped in the state of Ti—C bonds can be obtained relatively easily by adjusting the heating temperature and the heat treatment time. If the amount of carbon doped is small, the carbon-doped titanium oxide layer is transparent. As the amount of carbon doped increases, the carbon-doped titanium oxide layer becomes translucent or opaque. Thus, a transparent plate, which is excellent in durability (high hardness, scratch resistance, wear resistance, chemical resistance, heat resistance) and functions as a visible light responding photocatalyst, can be obtained by forming a transparent carbon-doped titanium oxide layer on a transparent plate-shaped core material. Furthermore, a decorative laminated sheet, which is excellent in durability (high hardness, scratch resistance, wear resistance, chemical resistance, heat resistance) and functions as a visible light responding photocatalyst, can be obtained by forming a transparent carbon-doped titanium oxide layer on a plate having a colored pattern on the surface. If the substrate, which has at least a surface layer comprising titanium, a titanium alloy, a titanium alloy oxide, or titanium oxide, is composed of the surface portion forming layer and the core material, and the thickness of the surface portion forming layer is 500 nm or less, heating to a temperature in the vicinity of the melting point of the surface portion forming layer generates undulations, like many islets floating on the sea, on the surface to render the substrate translucent.

In the multifunctional material having a carbon-doped titanium oxide layer having carbon doped in the state of Ti—C bonds according to the present invention, the thickness of the carbon-doped titanium oxide layer is preferably 10 nm or more and, in order to achieve high hardness, scratch resistance and wear resistance, it is more preferable for the thickness to be 50 nm or larger. If the thickness of the carbon-doped titanium oxide layer is less than 10 nm, the durability of the resulting multifunctional material having the carbon-doped titanium oxide layer tends to be insufficient. The upper limit of the thickness of the carbon-doped titanium oxide layer is not limited, although the cost and the effects achieved need to be taken into consideration.

The carbon-doped titanium oxide layer of the multifunctional material according to the present invention has a relatively high content of carbon, and contains doped carbon as Ti—C bonds, unlike chemically modified titanium oxide as described in the aforementioned non-patent document 3, or titanium oxides containing titanium compounds Ti—O—X doped with various atoms or anions X which have been proposed conventionally. As a result, its mechanical strengths such as scratch resistance and wear resistance are improved, and its Vickers hardness is considered to be markedly increased. Its heat resistance is also increased.

The carbon-doped titanium oxide layer of the multifunctional material according to the present invention has a Vickers hardness of 300 or higher, preferably 500 or higher, more preferably 700 or higher, most preferably 1,000 or higher. The Vickers hardness of 1,000 or higher means higher hardness than the hardness of a hard chromium plating. Thus, the multifunctional material of the present invention can be meaningfully utilized in various technical fields where hard chromium platings have been utilized so far.

The carbon-doped titanium oxide layer of the multifunctional material according to the present invention responds not only to ultraviolet radiation, but also to visible light having a wavelength of 400 nm or longer, and acts effectively as a photocatalyst. Thus, the multifunctional material of the present invention can be used as a visible light responding photocatalyst, and exhibits a photocatalytic function indoors as well as outdoors. Moreover, the carbon-doped titanium oxide layer of the multifunctional material according to the present invention shows super hydrophilicity expressed as a contact angle of 3° or less.

Furthermore, the carbon-doped titanium oxide layer of the multifunctional material according to the present invention is also excellent in chemical resistance. After this layer was immersed for 1 week in an aqueous solution of 1M sulfuric acid and for 1 week in an aqueous solution of 1M sodium hydroxide, the film-hardness, wear resistance, and photocurrent density of the layer were measured, and compared with its measured values before treatment. No significant changes were observed. Incidentally, commercially available titanium oxide films have minimal acid resistance and minimal alkali resistance, because their binders, depending on their types, generally dissolve in acids or alkalis, and thus these films peel off.

Besides, the carbon-doped titanium oxide layer of the multifunctional material according to the present invention can be used as a catalyst responding to radiation such as gamma rays. The inventors previously invented a thermal-sprayed coating of titanium oxide or the like suppressing stress-corrosion cracking or scale deposition of structural members of a nuclear reactor in response to radiation. When the carbon-doped titanium oxide layer of the multifunctional material according to the present invention is similarly used as such a radiation responding catalyst, it can lower the potential of the base material, suppressing pitting, general corrosion, and stress-corrosion cracking. Also, it shows the effect of being capable of decomposing scale or dirt by its oxidizing power. Compared with other methods for forming films of radiation-responsive catalysts, the manufacturing method of the present invention is convenient, and is superior from the aspects of durability such as chemical resistance and wear resistance.

EXAMPLES

The present invention will be described in further detail based on Examples and Comparative Examples.

Examples 1 to 3

A 0.3 mm thick titanium plate was heat-treated using a combustion flame of acetylene such that the surface temperature of the titanium plate was about 1,100° C., thereby forming the titanium plate having, as a surface layer, a carbon-doped titanium oxide layer having carbon doped in the state of Ti—C bonds. The heat treatment time at 1,100° C. was set at 5 seconds (Example 1), 3 seconds (Example 2), and 1 second (Example 3). As a result, the titanium plates formed had the carbon-doped titanium oxide layers different in the amount of carbon doped and the thickness of the carbon-doped titanium oxide layer.

The carbon contents of the carbon-doped titanium oxide layers formed in Examples 1 to 3, which had carbon doped in the state of Ti—C bonds, were determined by a fluorescent X-ray analyzer. Based on the carbon content, the molecular structure of $TiO_{2-x}C_x$ was assumed. The results were a carbon content of 8 at % and $TiO_{1.76}C_{0.24}$ in Example 1, a carbon content of about 3.3 at % and $TiO_{1.90}C_{0.10}$ in Example 2, and a carbon content of 1.7 at % and $TiO_{1.95}C_{0.05}$ in Example 3. The carbon-doped titanium oxide layers formed in Examples 1 to 3, which had carbon doped in the state of Ti—C bonds, were super hydrophilic as indicated by a contact angle, with respect to a water drop, of the order of 2°.

Comparative Example 1

A commercially available titanium oxide sol (STS-01, ISHIHARA SANGYO KAISHA, LTD.) was spin-coated on a 0.3 mm thick titanium plate, and heated for increased adhesion, whereby the titanium plate having a titanium oxide film was formed.

Comparative Example 2

A commercially available product having titanium oxide spray-coated on an SUS plate was taken as a substrate having a titanium oxide film of Comparative Example 2.

Test Example 1 (Vickers Hardness)

The carbon-doped titanium oxide layer of Example 1, which had carbon doped in the state of Ti—C bonds, and the titanium oxide film of Comparative Example 1 were measured for film hardness using a nano-hardness tester (NHT) (CSM Instruments, Switzerland) under the following conditions: indenter: Bercovici type, test load: 2 mN, load removal rate: 4 mN/min. The carbon-doped titanium oxide layer of Example 1, which had carbon doped in the state of Ti—C bonds, had a high Vickers hardness value of 1,340. On the other hand, the Vickers hardness of the titanium oxide film of Comparative Example 1 was 160.

Figure 1:
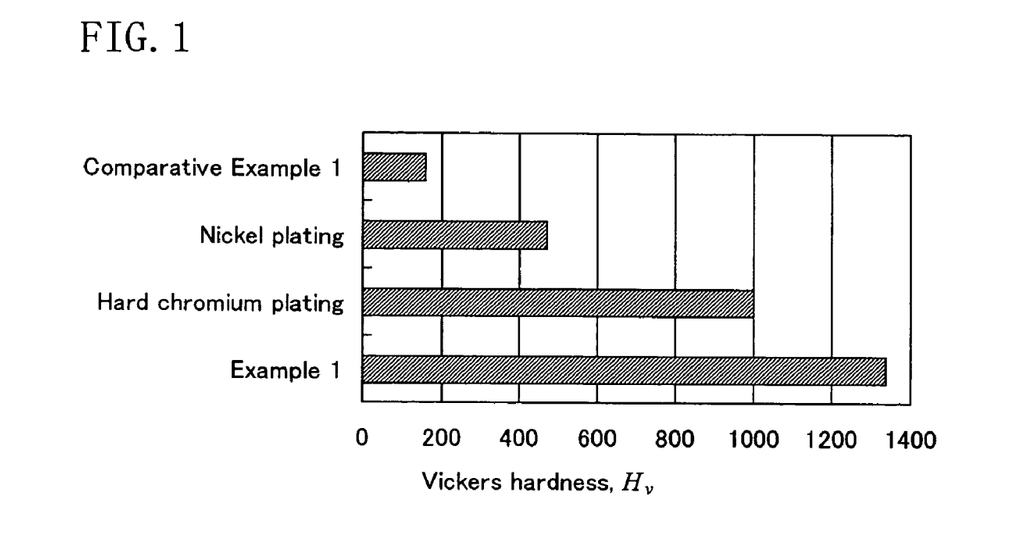
FIG. 1 is a view showing the results of a film hardness test of Test Example 1.

The results are shown in FIG. 1. For reference, the documented Vickers hardness values of a hard chromium plating layer and a nickel plating layer (quoted from Tomono, "A Manual of Practical Platings", Chapter 6, Ohmsha (1971)) are also shown. The carbon-doped titanium oxide layer of Example 1, which had carbon doped in the state of Ti—C bonds, clearly has higher hardness than do the nickel plating layer and the hard chromium plating layer.

Test Example 2 (Scratch Resistance)

In connection with the carbon-doped titanium oxide layer of Example 1, which had carbon doped in the state of Ti—C bonds, and the titanium oxide film of Comparative Example 1, a scratch resistance test was conducted using a micro-scratch tester (MST) (CSM Instruments, Switzerland) under the following conditions: indenter: Rockwell (diamond), tip radius 200 μm, initial load: 0 N, final load: 30 N, load rate: 50N/min, scratch length: 6 mm, stage speed: 10.5 mm/min. A "peeling start" load, under which a small peeling of the film occurred in the scratch mark, was measured. Also, a "general peeling" load, under which peeling of the film occurred in the entire scratch mark, was measured. The results are shown in Table 1.

TABLE 1

|  | Ex. 1 | Comp. Ex. 1 |
| --- | --- | --- |
| Peeling start load (N) | 18.7 | 3.7 |
| General peeling load (N) | 25.7 | 5.9 |

Test Example 3 (Wear Resistance)

In connection with the carbon-doped titanium oxide layer of Example 1, which had carbon doped in the state of Ti—C bonds, and the titanium oxide film of Comparative Example 1, a wear test was conducted using a high-temperature tribometer (HT-TRM) (CSM Instruments, Switzerland) under the following conditions: test temperature: room temperature and 470° C., ball: SiC ball with a diameter of 12.4 mm, load: 1 N, slide speed: 20 mm/sec, turning radius: 1 mm, test rotational speed: 1,000 revolutions.

As a result, peeling occurred at both of room temperature and 470° C. in connection with the titanium oxide film of Comparative Example 1. In regard to the carbon-doped titanium oxide layer of Example 1, which had carbon doped in the state of Ti—C bonds, on the other hand, significant trace wear was not detected at room temperature and 470° C.

Test Example 4 (Chemical Resistance)

The titanium plate having the carbon-doped titanium oxide layer of Example 1, which had carbon doped in the state of Ti—C bonds, was immersed in an aqueous solution of 1M sulfuric acid for 1 week at room temperature and in an aqueous solution of 1M sodium hydroxide for 1 week at-room temperature, and then the film hardness, wear resistance, and photocurrent density to be described later were measured. No significant differences were observed between the values before immersion and the values after immersion. That is, the carbon-doped titanium oxide layer of Example 1, which had carbon doped in the state of Ti—C bonds, was found to have high chemical resistance.

Test Example 5 (structure of carbon-doped titanium oxide layer having carbon doped in the state of Ti—C bonds)

Figure 2:
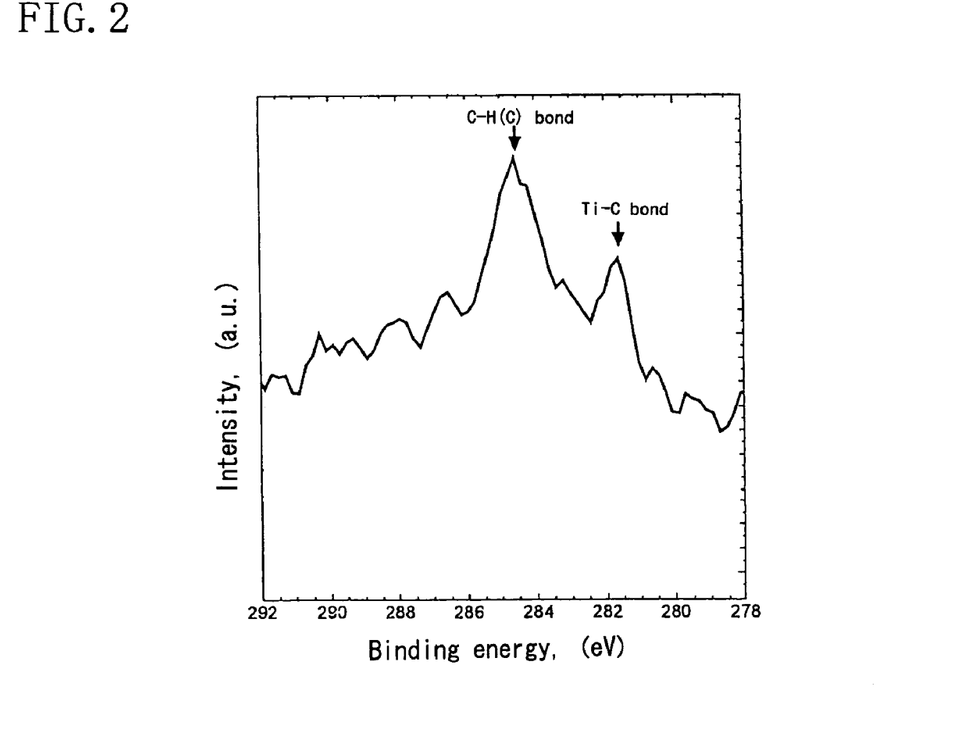
FIG. 2 is a view showing the results of XPS analysis of Test Example 5.

In connection with the carbon-doped titanium oxide layer of Example 1, which had carbon doped in the state of Ti—C bonds, Ar ion sputtering was performed for 2,700 seconds using an X-ray photo-electron spectrochemical analyzer (XPS) at an acceleration voltage of 10 kV and with Al as a target, and analysis was started. When the sputtering speed was 0.64 Å/s equivalent to that for a SiO2 film, the depth was about 173 nm. The results of the XPS analysis are shown in FIG. 2. When the binding energy is 284.6 eV, the highest peak appears. It is judged to be ascribed to a C—H(C) bond observed generally with C1s analysis. The second highest peak is seen when the binding energy is 281.7 eV. Since the binding energy of a Ti—C bond is 281.6 eV, it is judged that C has been doped as Ti—C bonds in the carbon-doped titanium oxide layer of Example 1. Upon XPS analysis made at 11 points at different positions in the depth direction of the carbon-doped titanium oxide layer, similar peaks appeared near 281.6 eV at all points.

Ti—C bonds were also confirmed at the boundaries between the carbon-doped titanium oxide layer and the substrate. Thus, it is estimated that the Ti—C bonds in the carbon-doped titanium oxide layer renders hardness high, and that the film peel strength is markedly increased by the Ti—C bonds at the boundaries between the carbon-doped titanium oxide layer and the substrate.

Test Example 6 (Wavelength Response)

The wavelength responses of the carbon-doped titanium oxide layers of Examples 1 to 3, which had carbon doped in the state of Ti—C bonds, and the titanium oxide films of Comparative Examples 1 and 2 were measured using Oriel's monochromator. Concretely, a voltage of 0.3V was applied between each of the layers and the films and a counter electrode in a 0.05M aqueous solution of sodium sulfate, and photocurrent density was measured.

Figure 3:
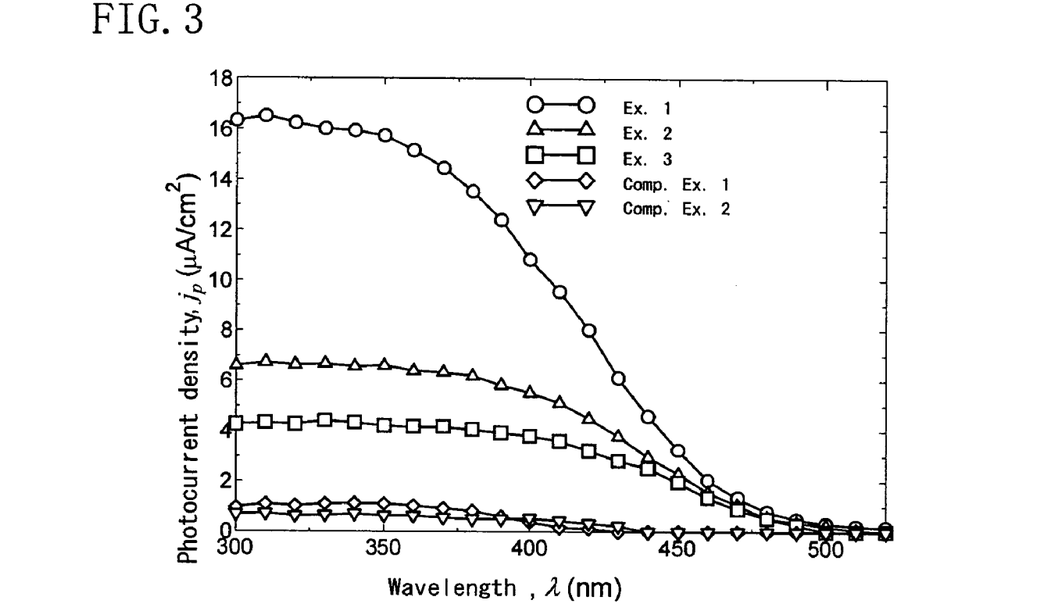
FIG. 3 is a view showing the wavelength response of a photocurrent density in Test Example 6.

The results are shown in FIG. 3. FIG. 3 shows the resulting photo current density jp versus wavelength irradiated. The wavelength absorption edges of the carbon-doped titanium oxide layers of Examples 1 to 3, which had carbon doped in the state of Ti—C bonds, reached 490 nm, showing that as the amount of carbon doped increased, the photocurrent density increased. It was also found that when the amount of carbon doped exceeded 10 at %, the current density tended to decrease, and if the amount of carbon doped further exceeded 15 at %, this tendency became marked, although these findings are not illustrated here. Thus, it was noted that the amount of carbon doped had an optimal value at 1 to 10 at %. In the titanium oxide films of Comparative Examples 1 and 2, on the other hand, it was found that photocurrent density was very low, and the wavelength absorption edge was of the order of 410 nm.

Test Example 7 (Quantum Efficiency)

Figure 4:
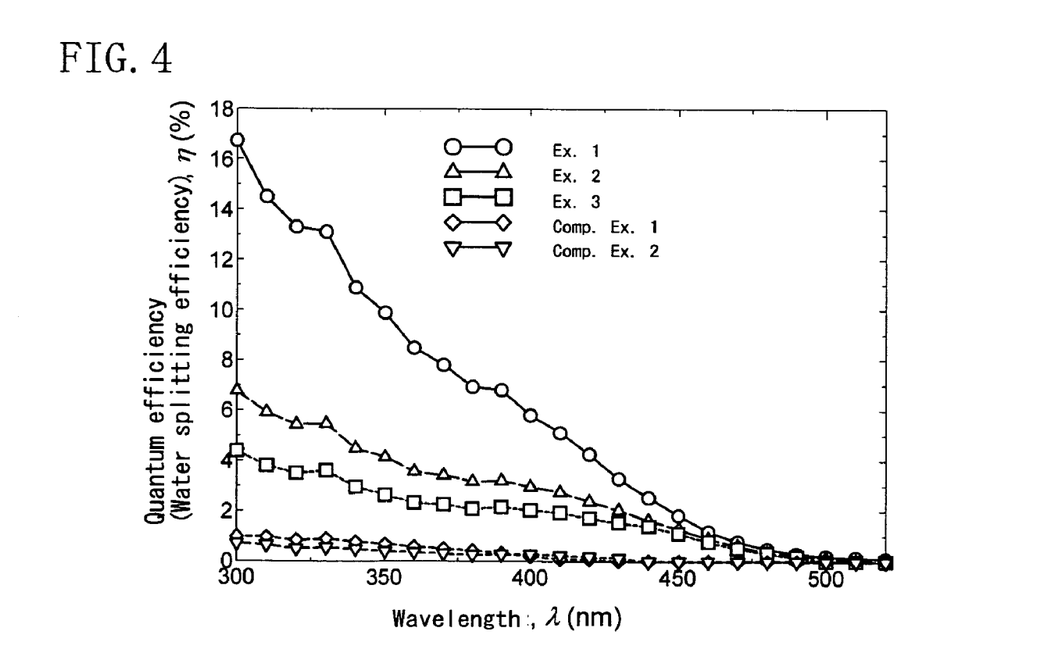
FIG. 4 is a view showing the test results on a quantum efficiency in Test Example 7.

In connection with the carbon-doped titanium oxide layers of Examples 1 to 3, which had carbon doped in the state of Ti—C bonds, and the titanium oxide films of Comparative Examples 1 and 2, the quantum efficiency η defined by the following equation was obtained:

$$\eta = j_p(E_{ws} - E_{app})/I$$

where $E_{ws}$ is the theoretical decomposition voltage of water (=1.23V), $E_{app}$ is applied voltage (=0.3V), and I is the intensity of irradiated light. The results are shown in FIG. 4. FIG. 4 shows the quantum efficiency η versus the wavelength of irradiated light.

As is clear from FIG. 4, the quantum efficiencies of the carbon-doped titanium oxide layers of Examples 1 to 3, which had carbon doped in the state of Ti—C bonds, were found to be markedly high, and their conversion efficiencies at wavelengths in the vicinity of 450 nm were found to be superior to the conversion efficiencies of the titanium oxide films of Comparative Examples 1 and 2 in an ultraviolet region (200 to 380 nm). It was also shown that the water decomposition efficiency of the carbon-doped titanium oxide layer of Example 1, which had carbon doped in the state of Ti—C bonds, was about 8% at a wavelength of 370 nm, and the efficiency exceeding 10% was obtained at a wavelength of 350 nm or less.

Test Example 8 (Deodorization Test)

In connection with the carbon-doped titanium oxide layers of Examples 1 and 2, which had carbon doped in the state of Ti—C bonds, and the titanium oxide film of Comparative Example 1, a deodorization test was conducted. Concretely, acetaldehyde, which is generally used in a deodorization test, was sealed up in a 1,000 ml glass container along with the substrate having the carbon-doped titanium oxide layer. After the influence of a decrease in the concentration due to initial adsorption became negligible, the sample was irradiated with visible light by a fluorescent lamp provided with a UV cut filter, and the acetaldehyde concentration was measured by gas chromatography at predetermined irradiation time intervals. The surface area of each layers and films was set at 8.0 cm².

Figure 5:
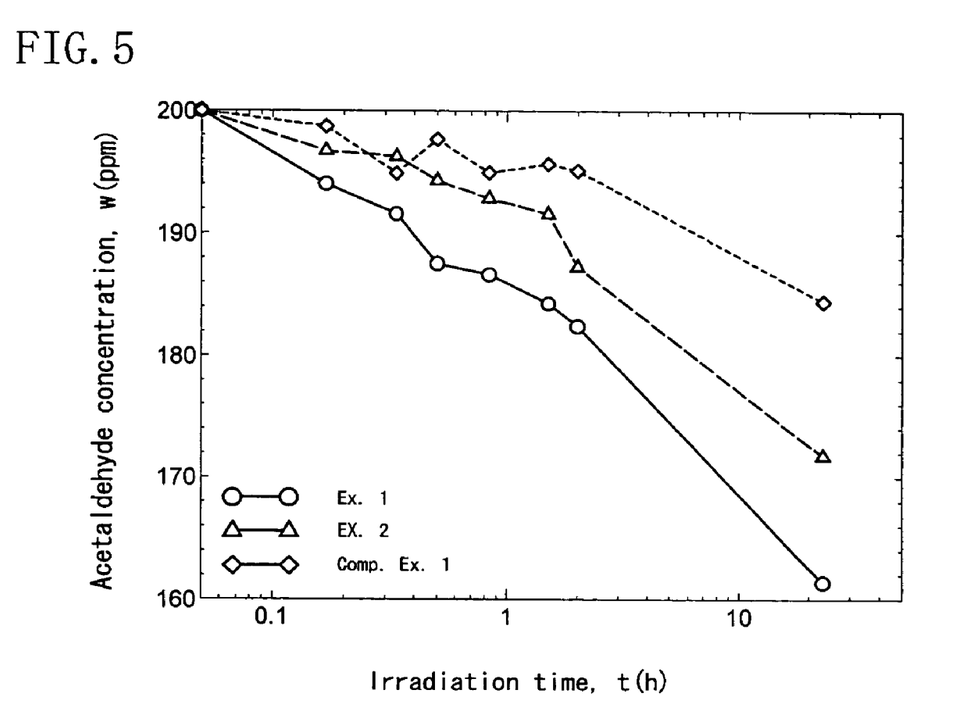
FIG. 5 is a view showing the results of a deodorizing test in Test Example 8.

The results are shown in FIG. 5. FIG. 5 shows the acetaldehyde concentration versus elapsed time periods after initiation of irradiation with visible light. The acetaldehyde decomposition rates of the carbon-doped titanium oxide layers of Examples 1 and 2 were found to take values about twice or higher the acetaldehyde decomposition rate of the titanium oxide film of Comparative Example 1. It was also found that the carbon-doped titanium oxide layer of Example 1 having a large amount of carbon doped and a high quantum efficiency showed a high decomposition rate in comparison with the carbon-doped titanium oxide layer of Example 2.

Test Example 9 (Antifouling Test)

In connection with the carbon-doped titanium oxide layer of Example 1 and the titanium oxide film of Comparative Example 1, an antifouling test was conducted. Each layer and film was installed in a smoking room of Central Research Institute of Electric Power Industry, and dirt on the surface after 145 days was observed. There was no direct entry of sunlight into this smoking room.

Figure 6:
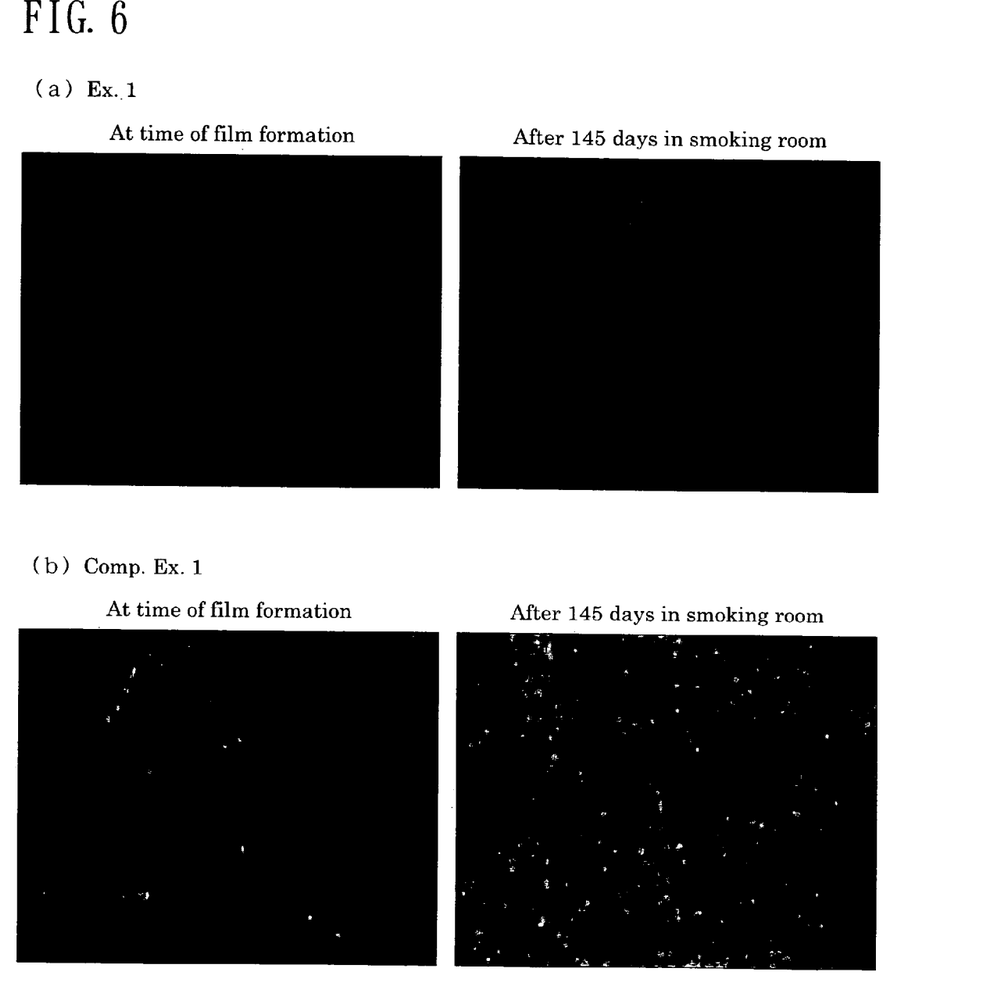
FIGS. 6(a) and 6(b) are photographs showing the results of an antifouling test in Test Example 9.

Photographs showing the results are shown in FIGS. 6(a) and 6(b). Nicotine deposited on the surface of the titanium oxide film of Comparative Example 1, developing a light yellow color. On the other hand, the surface of the carbon-doped titanium oxide layer of Example 1 showed no particular change, and was kept clean, proving that an antifouling effect was fully exhibited.

Examples 4 to 7

In the same manner as in Examples 1 to 3, 0.3 mm thick titanium plates were heat-treated at surface temperatures shown in Table 2 for periods of time shown in Table 2 with the use of a combustion flame of acetylene, thereby forming the titanium plates each having a carbon-doped titanium oxide layer as a surface layer.

Comparative Example 3

A 0.3 mm thick titanium plate was heat-treated at a surface temperature shown in Table 2 for a period of time shown in Table 2 with the use of a combustion flame of natural gas.

Test Example 10

The carbon-doped titanium oxide layers of Examples 4 to 11 and the film of Comparative Example 3 were measured for Vickers hardness (HV) in the same manner as in the aforementioned Test Example 1. The results are shown in Table 2. The carbon-doped titanium oxide layers formed in Examples 4 to 11 were super hydrophilic as indicated by a contact angle, with respect to a water drop, of the order of 2°.

TABLE 2

| | Fuel | Surface temperature | Heating time | HV |
|---|---|---|---|---|
| Ex. 4 | Acetylene | 1,000° C. | 10 seconds | 1,200 |
| Ex. 5 | Acetylene | 1,100° C. | 5 seconds | 1,200 |
| Ex. 6 | Acetylene | 1,200° C. | 1 second | 1,200 |
| Ex. 7 | Acetylene | 1,500° C. | 0.5 second | 1,200 |
| Comp. Ex. 3 | Natural gas | 850° C. | 5 seconds | 160 |

As is clear from the data shown in Table 2, when heat treatment was performed using a combustion gas from a natural gas such that the surface temperature became 850° C., a film having Vickers hardness of only 160 was obtained. In Examples 4 to 7 involving heat treatment using a combustion gas of acetylene such that the surface temperature became 1,000° C. or higher, carbon-doped titanium oxide layers having Vickers hardness of 1,200 were obtained.

Test Example 11

Figure 7:
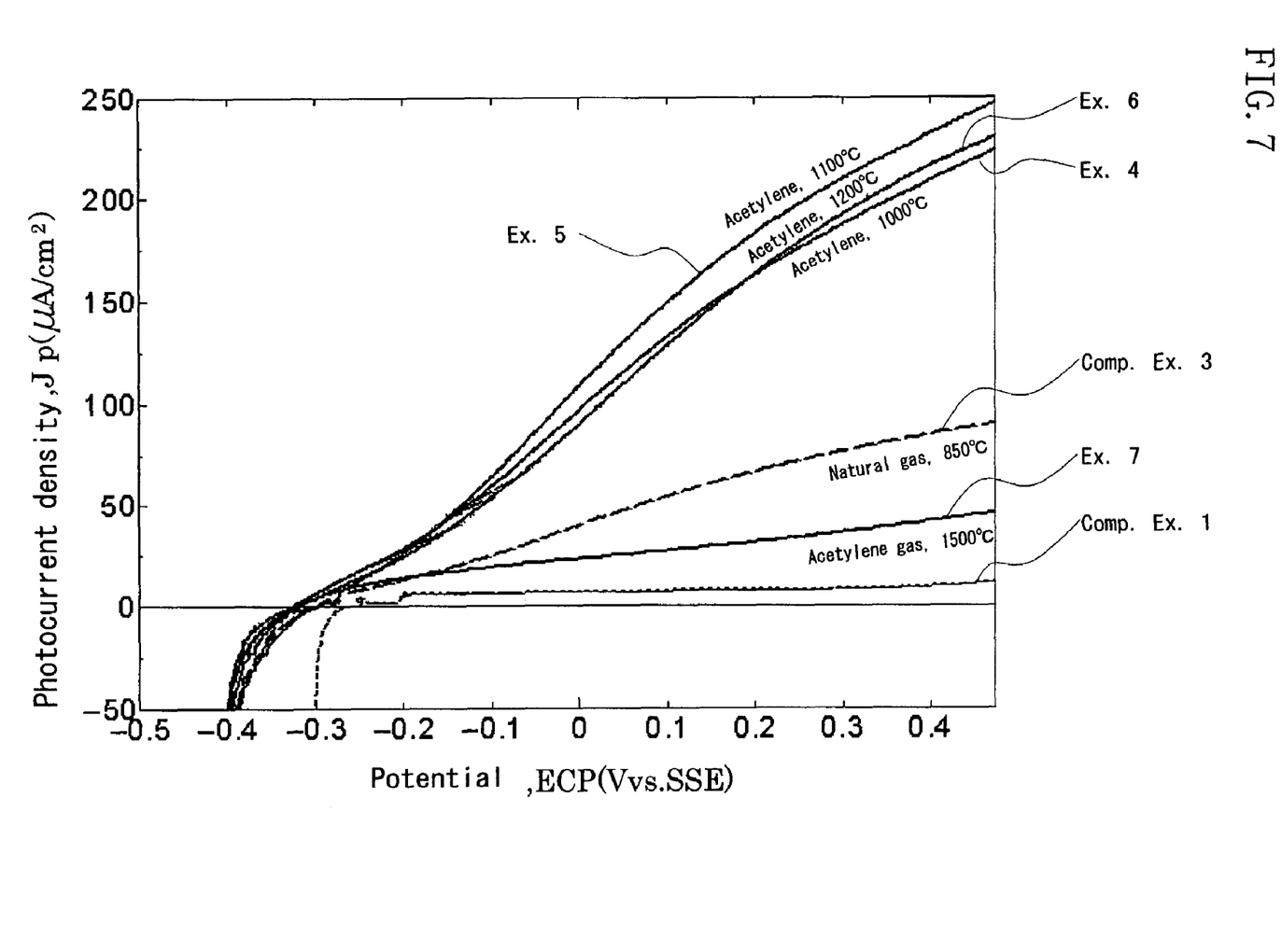
FIG. 7 is a view showing the results of Test Example 11.

In connection with the carbon-doped titanium oxide layers of Examples 4 to 7 and the titanium oxide films of Comparative Examples 1 and 3, photocurrent density was measured, with a voltage of 0.3V being applied between each of the layers and films and a counter electrode in a 0.05M aqueous solution of sodium sulfate, and the sample being irradiated with light of 300 nm to 520 nm, as in Test Example 6. The results are shown in FIG. 7. FIG. 7 shows the resulting photocurrent density jp versus potential ECP (V vs. SSE).

The carbon-doped titanium oxide layers of Examples 4 to 6, obtained by performing heat treatment using a combustion gas of acetylene such that the surface temperature was 1,000 to 1,200° C., were found to have a relatively high photocurrent density and to be superior. On the other hand, the titanium oxide layer of Comparative Example 3, obtained by performing heat treatment such that the surface temperature was 850° C., and the carbon-doped titanium oxide layer of Example 7, obtained by performing heat treatment such that the surface temperature was 1,500° C., were found to have a relatively low photocurrent density.

Example 12

A 0.3 mm thick Ti-6Al-4V alloy plate was heat-treated using a combustion flame of acetylene such that the surface temperature was about 1,100° C., thereby forming the alloy plate comprising a titanium alloy and containing carbon-doped titanium oxide in a surface layer. The heat treatment time at 1,100° C. was adjusted to 60 seconds. The thus formed layer containing carbon-doped titanium oxide was super hydrophilic as indicated by a contact angle, with respect to a water drop, of the order of 2°, and showed the same photocatalytic activity as that of the carbon-doped titanium oxide layer obtained in Example 4.

Example 13

A thin titanium film having a film thickness of about 500 nm was formed on the surface of a 0.3 mm thick stainless steel plate (SUS316) by sputtering. This stainless steel plate was heat-treated using a combustion flame of acetylene such that the surface temperature was about 900° C., thereby producing the stainless steel plate having a carbon-doped titanium oxide layer as a surface layer. The heat treatment time at 900° C. was set at 15 seconds. The thus formed carbon-doped titanium oxide layer was super hydrophilic as indicated by a contact angle, with respect to a water drop, of the order of 2°, and showed the same photocatalytic activity as that of the carbon-doped titanium oxide layer obtained in Example 4.

Example 14

A titanium oxide powder having a particle size of 20μm was supplied in to a combustion flame of acetylene, and was allowed to dwell in the combustion flame for a predetermined time to heat-treat the powder such that the surface temperature was about 1,000° C. By so doing, a titanium powder having a carbon-doped titanium oxide layer as a surface layer was produced. The heat treatment time at 1,000° C. was set at 4 seconds. The thus formed titanium powder having the carbon-doped titanium oxide layer showed the same photocatalytic activity as that of the carbon-doped titanium oxide layer obtained in Example 4.

Examples 15 to 16

Figure 8:
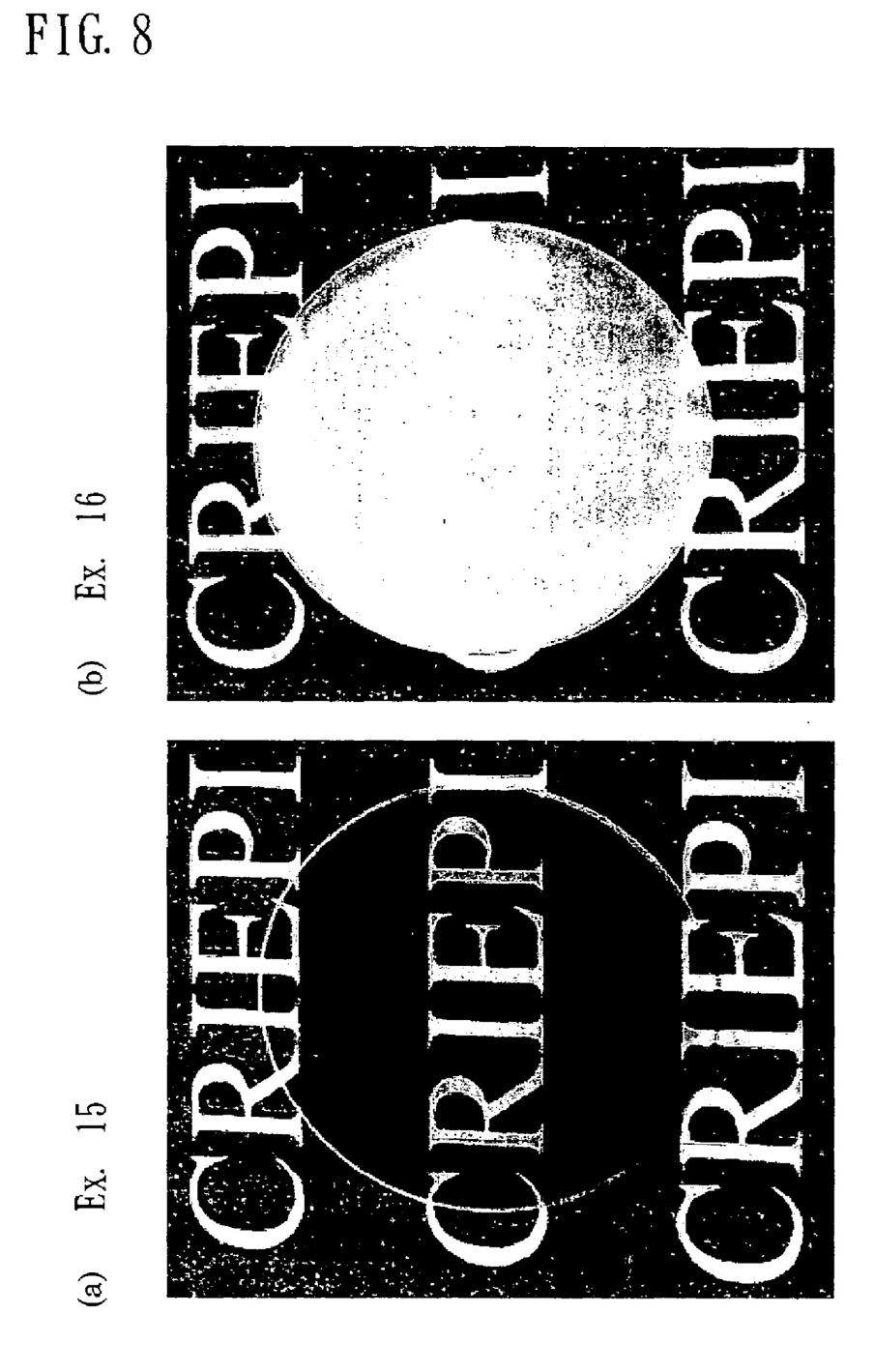
FIGS. 8(a) and 8(b) are photographs showing the light transmitted state of carbon-doped titanium oxide layers obtained in Examples 15 and 16.
Figure 9:
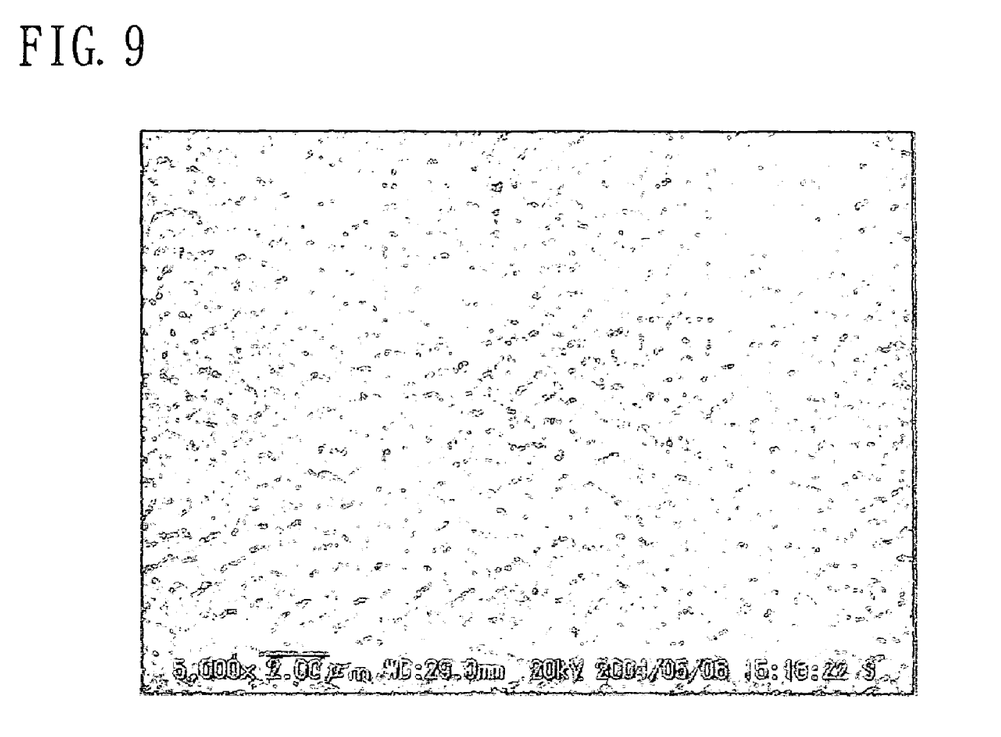
FIG. 9 is a photograph showing the surface state of the carbon doped titanium oxide layer obtained in Example 15.

A thin titanium film having a film thickness of about 100 nm was formed on the surface of a 1 mm thick glass plate (Pyrex (registered trademark)) by sputtering. This glass plate was heat-treated using a combustion flame of acetylene such that the surface temperature was about 1,100° C. (Example 15) or 1,500° C. (Example 16), thereby producing the glass plate having a carbon-doped titanium oxide layer as a surface layer. The heat treatment time at 1,100° C. or 1,500° C. was set at 10 seconds. The thus formed carbon-doped titanium oxide layer was transparent as shown in a photograph of FIG. 8(a) when the surface temperature was 1,100° C. However, when the surface temperature was 1,500° C., undulations, like many islets floating on the sea, were generated on the surface, as shown in FIG. 9, so that the layer was translucent as shown in FIG. 8(b).

INDUSTRIAL APPLICABILITY

The multifunctional material according to the present invention can be expected to find use in products intended to lower the potential of a base material, thereby preventing pitting, general corrosion, and stress-corrosion cracking. Furthermore, this layer is used as a radiation responding catalyst, which responds to radiation such as gamma rays as well as ultraviolet rays, in order to suppress stress-corrosion cracking or scale deposition of structural members of a nuclear reactor. The layer having such a use can be easily formed in comparison with films formed by other film-forming methods, and can show enhanced durability.

The invention claimed is:

1. A multifunctional material characterized by having
   (a) a surface layer comprising a carbon-doped titanium oxide layer, and
   (b) titanium, a titanium alloy, a titanium alloy oxide, or titanium oxide as a layer below the surface layer,
   wherein the carbon-doped titanium oxide layer has the carbon doped in a state of Ti-C bonds, is excellent in durability, functions as a visible light responding photocatalyst, and contains 1 to 15 at% of carbon.

2. The multifunctional material according to claim 1, characterized in that Vickers hardness of the carbon-doped titanium oxide layer is 300 or higher.

3. The multifunctional material according to claim 2, characterized in that the Vickers hardness of the carbon-doped titanium oxide layer is 1,000 or higher.

4. The multifunctional material according to claim 1, characterized in that the multifunctional material is composed of the carbon-doped titanium oxide layer as the surface layer provided on a core material via an intermediate layer, wherein the intermediate layer is titanium, a titanium alloy, a titanium alloy oxide, or titanium oxide, and the core material is composed of a material other than titanium, a titanium alloy, and titanium oxide.

5. The multifunctional material according to claim 1, characterized in that the multifunctional material is powdery.

6. The multifunctional material according to claim 1, characterized in that the carbon-doped titanium oxide layer as the surface layer is bound via the Ti—C bonds to titanium, a titanium alloy, a titanium alloy oxide, or titanium oxide as a layer below the surface layer.

7. The multifunctional material according to claim 1, characterized in that the carbon-doped titanium oxide layer contains a titanium alloy component.

8. The multifunctional material according to claim 7, characterized in that the titanium alloy is Ti-6Al-4V, Ti-6Al-6V-2Sn, Ti-6Al-2Sn-4Zr-6Mo, Ti-10V-2Fe-3Al, Ti-7Al-4Mo, Ti-5Al-2.5Sn, Ti-6Al-5Zr-0.5Mo-0.2Si, Ti-5.5Al-3.5Sn-3Zr-0.3Mo-1Nb-0.3Si, Ti-8Al-1Mo-1V, Ti-6Al-2Sn-4Zr-2Mo, Ti-5Al-2Sn-2Zr-4Mo-4Cr, Ti-11.5Mo-6Zr-4.5Sn, Ti-15V-3Cr-3Al-3Sn, Ti-15Mo-5Zr-3Al, Ti-15Mo-5Zr, or Ti-13V-11Cr-3Al.

9. The multifunctional material according to claim 1, characterized in that the Vickers hardness of the carbon-doped titanium oxide layer is 1,000 or higher.

10. The multifunctional material according to claim 9, characterized in that the multifunctional material is composed of the carbon-doped titanium oxide layer as the surface layer provided on a core material via an intermediate layer, wherein the intermediate layer is titanium, a titanium alloy, a titanium alloy oxide, or titanium oxide, and the core material is composed of a material other than titanium, a titanium alloy, and titanium oxide.

11. The multifunctional material according to claim 9, characterized in that the carbon-doped titanium oxide layer as the surface layer is bound via the Ti—C bonds to titanium, a titanium alloy, a titanium alloy oxide, or titanium oxide as a layer below the surface layer.

12. The multifunctional material according to claim 11, characterized in that the layer below the surface layer comprises a titanium alloy, and the titanium alloy is Ti-6Al-4V, Ti-6Al-6V-2Sn, Ti-6Al-2Sn-4Zr-6Mo, Ti-10V-2Fe-3Al, Ti-7Al-4Mo, Ti-5Al-2.5Sn, Ti-6Al-5Zr-0.5Mo-0.2Si, Ti-5.5Al-3.5Sn-3Zr-0.3Mo-1Nb-0.3Si, Ti-8Al-1Mo-1V, Ti-6Al-2Sn-4Zr-2Mo, Ti-5Al-2Sn-2Zr-4Mo-4Cr, Ti-11.5Mo-6Zr-4.5Sn, Ti-15V-3Cr-3Al-3Sn, Ti-15Mo-5Zr-3Al, Ti-15Mo-5Zr, or Ti-13V-11Cr-3Al.

13. The multifunctional material according to claim 9, characterized in that the carbon-doped titanium oxide layer contains a titanium alloy component.

14. The multifunctional material according to claim 13, characterized in that the titanium alloy is Ti-6Al-4V, Ti-6Al-6V-2Sn, Ti-6Al-2Sn-4Zr-6Mo, Ti-10V-2Fe-3Al, Ti-7Al-4Mo, Ti-5Al-2.5Sn, Ti-6Al-5Zr-0.5Mo-0.2Si, Ti-5.5Al-3.5Sn-3Zr-0.3Mo-1Nb-0.3Si, Ti-8Al-1Mo-1V, Ti-6Al-2Sn-4Zr-2Mo, Ti-5Al-2Sn-2Zr-4Mo-4Cr, Ti-11.5Mo-6Zr-4.5Sn, Ti15V-3Cr-3Al-3Sn, Ti-15Mo-5Zr-3Al, Ti-15Mo-5Zr, or Ti-13V-11Cr-3Al.

15. The multifunctional material according to claim 1, characterized in that the multifunctional material is powdery.

16. A visible light responding photocatalyst characterized by having at least a surface layer comprising a carbon-doped titanium oxide layer, and having the carbon doped in a state of Ti—C bonds.

* * * * *